No. 734,784. PATENTED JULY 28, 1903.
F. O. WELLS.
MICROMETER GAGE.
APPLICATION FILED OCT. 20, 1902.
NO MODEL.
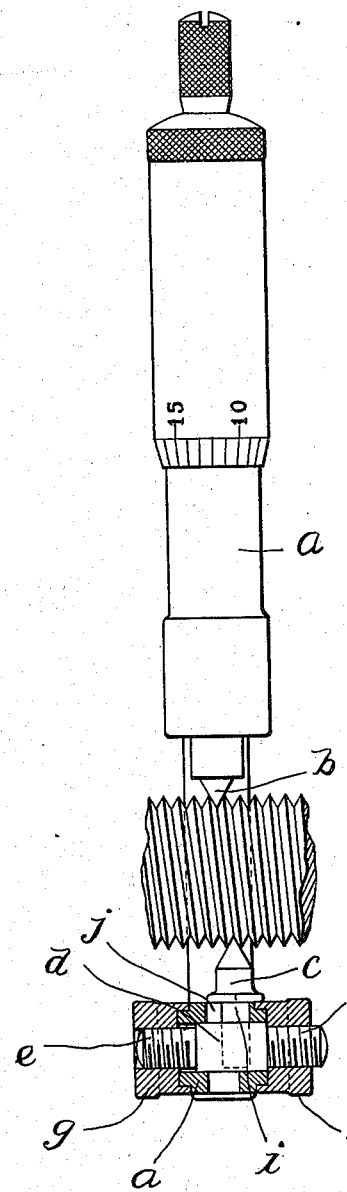
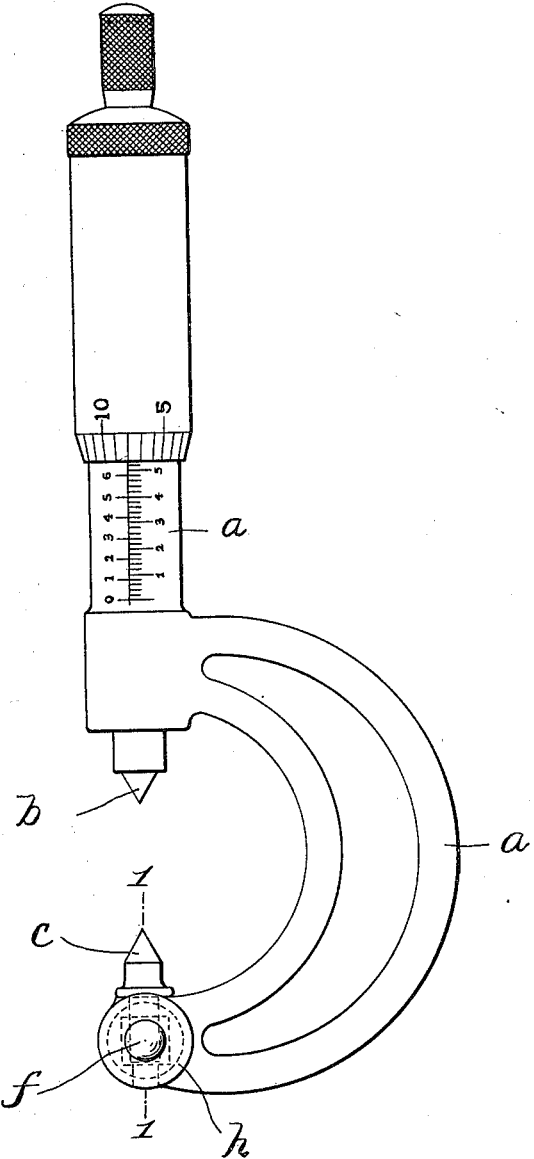
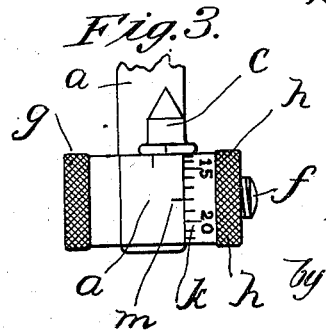

No. 734,784. Patented July 28, 1903.

UNITED STATES PATENT OFFICE.

FRANK O. WELLS, OF GREENFIELD, MASSACHUSETTS.

MICROMETER-GAGE.

SPECIFICATION forming part of Letters Patent No. 734,784, dated July 28, 1903.

Application filed October 20, 1902. Serial No. 127,910. (No model.)

*To all whom it may concern:*

Be it known that I, FRANK O. WELLS, a citizen of the United States of America, residing at Greenfield, in the county of Franklin and State of Massachusetts, have invented new and useful Improvements in Micrometer-Gages, of which the following is a specification.

This invention relates to gages, and especially to improvements in "micrometer-gages," so called, commonly used for obtaining accurate measurements, and this invention has particular reference to an improvement in this class of gages whereby the diameter of a screw-threaded bar or bolt may be obtained, said diameter being measured at that part of the thread on the bolt which the edge of the thread in the nut would occupy when screwed onto said bar or bolt. A glance at a threaded bolt shows that the bottom of the thread at two opposite points thereon lies at a greater or less distance to one side or the other of a line passing through the axis of the bolt at right angles, the distance of the thread on one side or the other from said imaginary line varying according to the pitch of the thread. Therefore the accurate measure of the diameter of a threaded bar is impossible with the gages as now manufactured, for the reason that the gage must be tilted in proportion to the pitch of the thread to introduce the points of the instrument into the thread on opposite sides of the bolt, whereas to obtain an "accurate measurement" as this term is understood in modern machine-shop practice requires that the instrument should be so held relative to the work that the points between which the measurements are taken may move toward the work in a plane at right angles to the axis of the bar being measured.

The object of the present invention is to provide an improvement in the construction of the well-known micrometer-gage whereby this end may be accomplished, the invention consisting in the provision of means whereby the fixed point or abutment of an ordinary micrometer-gage may be provided with a traverse-screw to move it one side or the other of a line drawn through the axis of the movable point of the gage and in providing said traverse-screw with a suitable scale similar to that on the movable point of the gage.

The points of the gage referred to for measuring screw-threads are tapered to an angle of sixty degrees, which is the United States standard taper for threads, and the extremities of these points will occupy when applied to a threaded bolt the same relation relative to the bottom of the thread cut on the latter as the edge of the thread of a nut would occupy if the latter were screwed onto a bolt— that is, neither the extremity of the point nor the extreme edge of the thread of the nut will touch the bottom of the thread on the bolt.

In the drawings forming part of this application, Figure 1 is a front view of a micrometer-gage of the ordinary type having my improvement applied thereto, the said improvement being shown in vertical section on line 1 1, Fig. 2. Fig. 2 is a side elevation of the gage, and Fig. 3 is a view of the end thereof to which my improvements are applied in front elevation.

Referring now to the drawings, $a$ may indicate the micrometer-gage, of the usual type, and $b$ the movable abutment-point thereof, which, as is well known, may vary in shape, but for screw-threads is tapered, as stated, to an angle of sixty degrees.

In carrying out my invention I make the point $c$, located opposite the point $b$, laterally movable instead of fixed, and to that end the lower end of the jaw of the gage has formed therethrough the square hole located at right angles to the line drawn through the axis of the point $b$. In this squared hole there is fitted accurately the rectangular block $d$, the rectangular portion of which is shorter than the thickness of the jaw in which it is located, to the end that said block may play endwise in said jaw without permitting the ends of the block to extend beyond the sides of the jaw. On each end of this block $d$ there is cut a fine screw-thread, (indicated by $e$ on one side and $f$ on the other side of the block,) and over each of these threaded ends there is fitted a nut, (indicated on the one side by $g$ and on the other by $h$.) There is located centrally of the block $d$ the point $c$, the outer end of which bears upon the upper side of the lower end of the jaw of the gage, which is planed off level to permit it to slide thereon, the lower end of the point $c$ consisting of a stem $i$ of smaller diameter, which passes through an elongated slot $j$, located in the upper side of the jaw parallel with the longitudinal dimension of the block $d$. The said stem $i$ is rigidly secured in said block $d$, and by loosening one of said nuts and tightening the other the point $c$ may be moved laterally as desired in either direction. The movable point $b$ is provided with the usual indicating-scale whereby the distance of said point from the opposite point $c$ may be indicated. When the two points $b$ and $c$ are oppositely located, then the zero-mark on the scale $k$ will register with the center mark $m$. Said scale $k$ is preferably laid out circumferentially around the nut $h$ and the center line $m$ marked on the jaw. This scale is for the purpose of showing how far to one side or the other the point $c$ is located relative to the vertical axis of the point $b$. For instance, if the diameter of a bolt having a twenty-thread cut thereon is to be measured the nut $h$ may be turned to move the point $c$ one-fortieth of an inch out of line with the point $b$, and the latter may then be adjusted toward or from said point $c$ after the gage has been applied to the bolt, and thus an accurate measure of the diameter of said bolt may be taken in a plane at right angles to the axis thereof, and it is only by this method that an accurate measure can be taken.

It is clear from the description of this construction that the instrument may be adapted to measure the diameter of a bar having any screw-thread cut thereon, whether that thread be a twenty-thread or a sixty-thread or any other, and in order to facilitate the use of the instrument a table may be prepared showing to what point to turn the nut $h$ according to the scale thereon to adapt the instrument to a thread of any pitch.

Obviously when one of the nuts $g$ or $h$ is used to move the point $c$ in one direction the other nut may then be turned up against the side of the jaw and serve as a lock-nut to secure said point.

Having thus described my invention, what I claim, and desire to secure by Letters Patent of the United States, is—

1. A micrometer-gage having the usual U-shaped body, a screw-operated member mounted in one jaw of said body movable toward the opposite jaw, there being in said opposite jaw a perforation located transversely to the axis of said screw-operated member and in the plane of said axis; a block mounted in said transverse perforation, an adjusting-nut on said block to move the latter, a point mounted on said block and extending toward said screw-operated member through a slot in the jaw in which said block is located.

2. A micrometer-gage having the usual U-shaped body, a screw-operated member mounted in one jaw of said body movable toward the opposite jaw, there being in said opposite jaw a perforation located transversely to the axis of said screw-operated member and in the plane of said axis; a block mounted in said transverse perforation, an adjusting-nut on each end of said block to move the latter in opposite directions, a point mounted on the block and extending toward said screw-operated member through a slot in the jaw in which said block is located.

FRANK O. WELLS.

Witnesses:
 ISAAC CHENEY,
 FRANCIS M. THOMPSON.